3,540,045
**ELECTROMAGNETIC POLARIZATION
SYSTEMS AND METHODS**
Ralph E. Taylor, Silver Spring, Md., assignor to the United States of America as represented by the Administrator of the National Aeronautics and Space Administration
Filed Jan. 10, 1969, Ser. No. 790,420
Int. Cl. H04b 7/10; G01s 9/22
U.S. Cl. 343—7.5
31 Claims

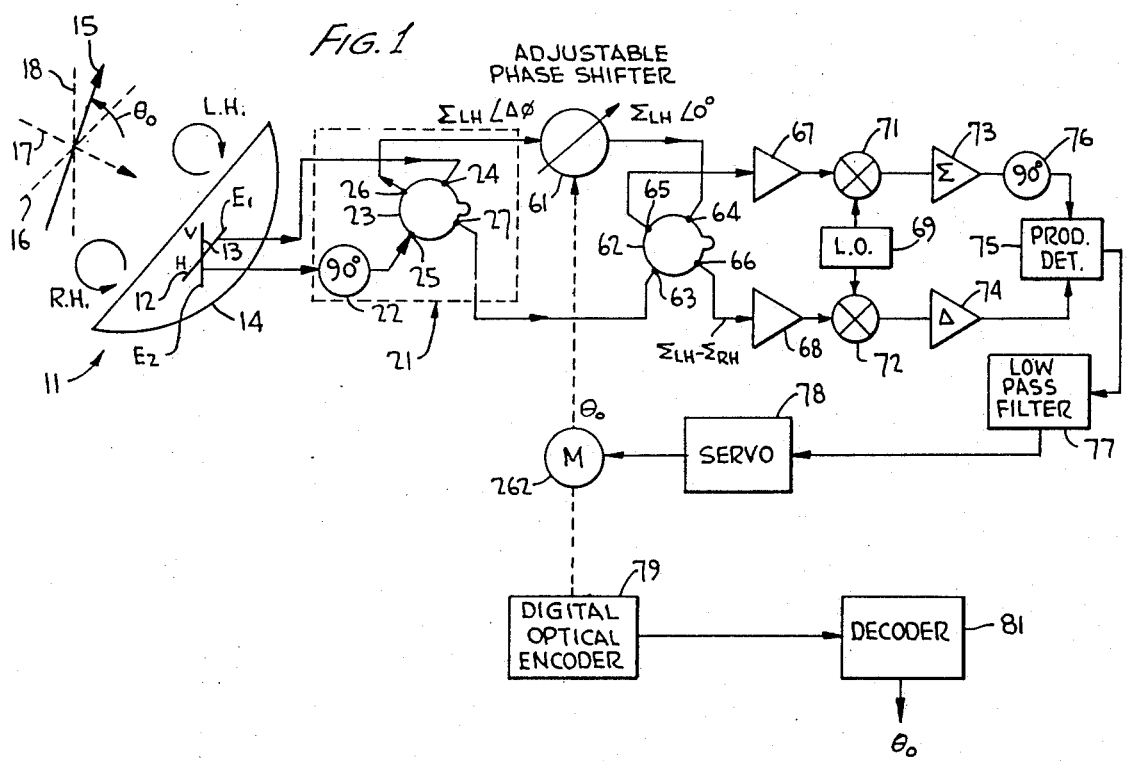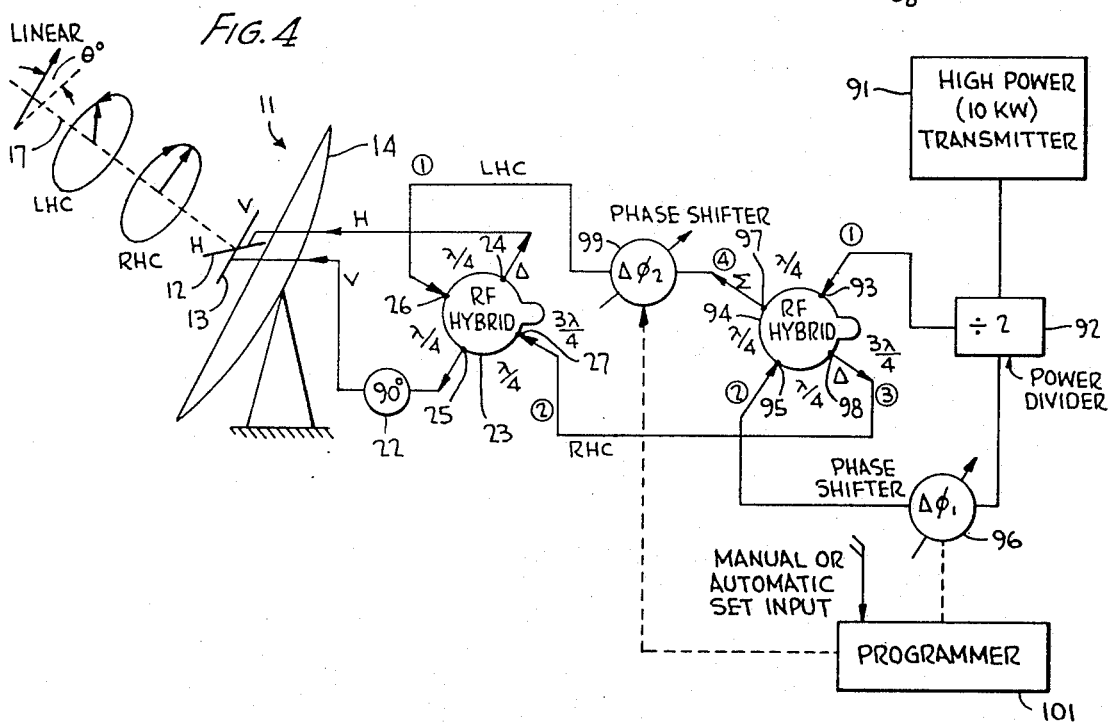

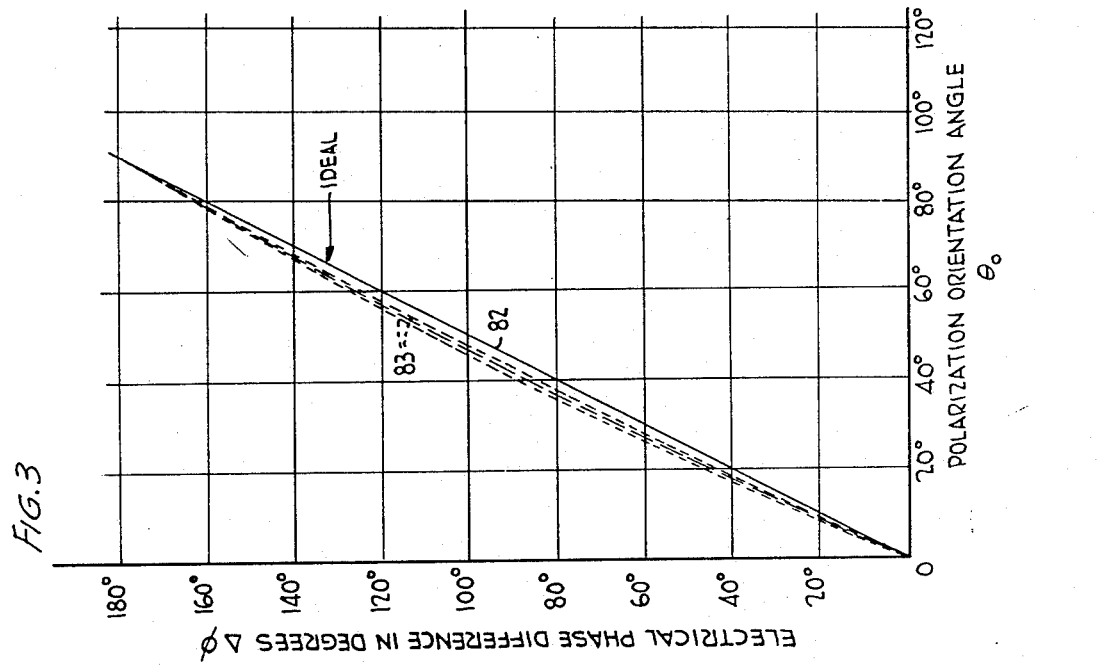
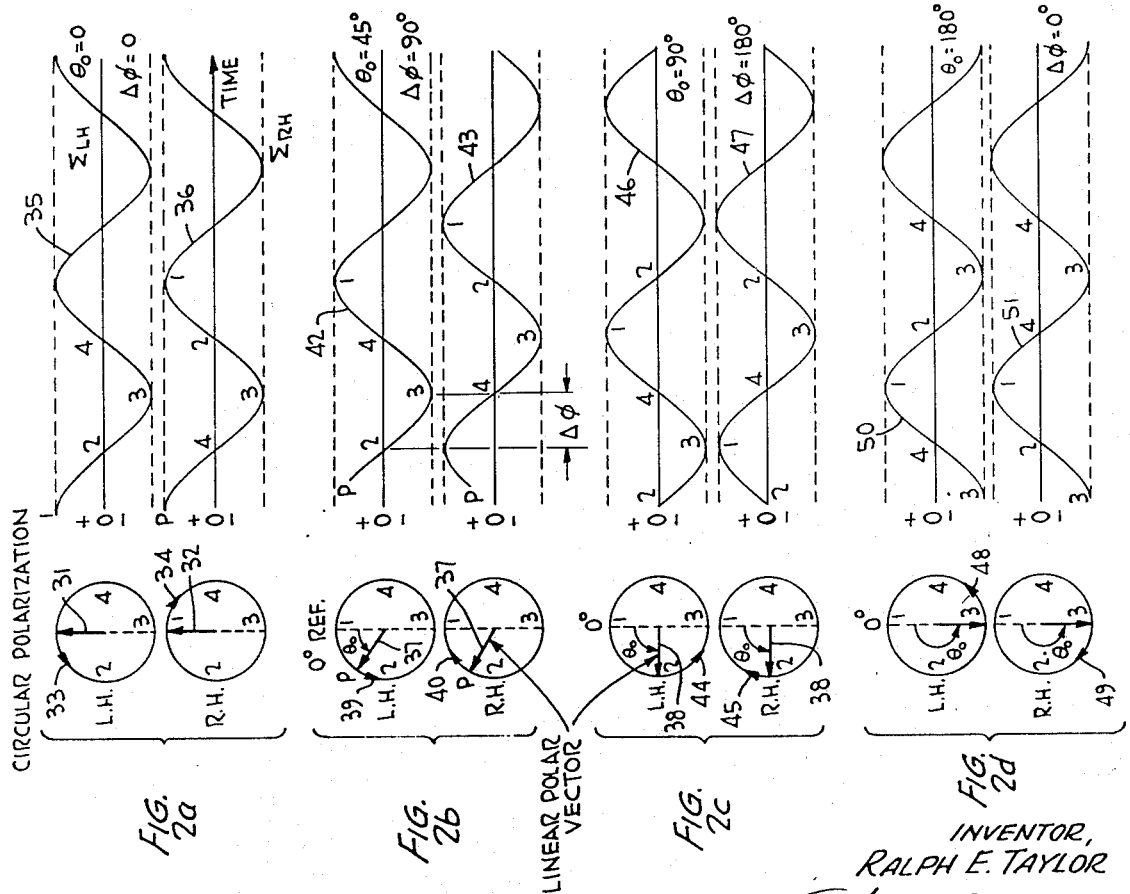

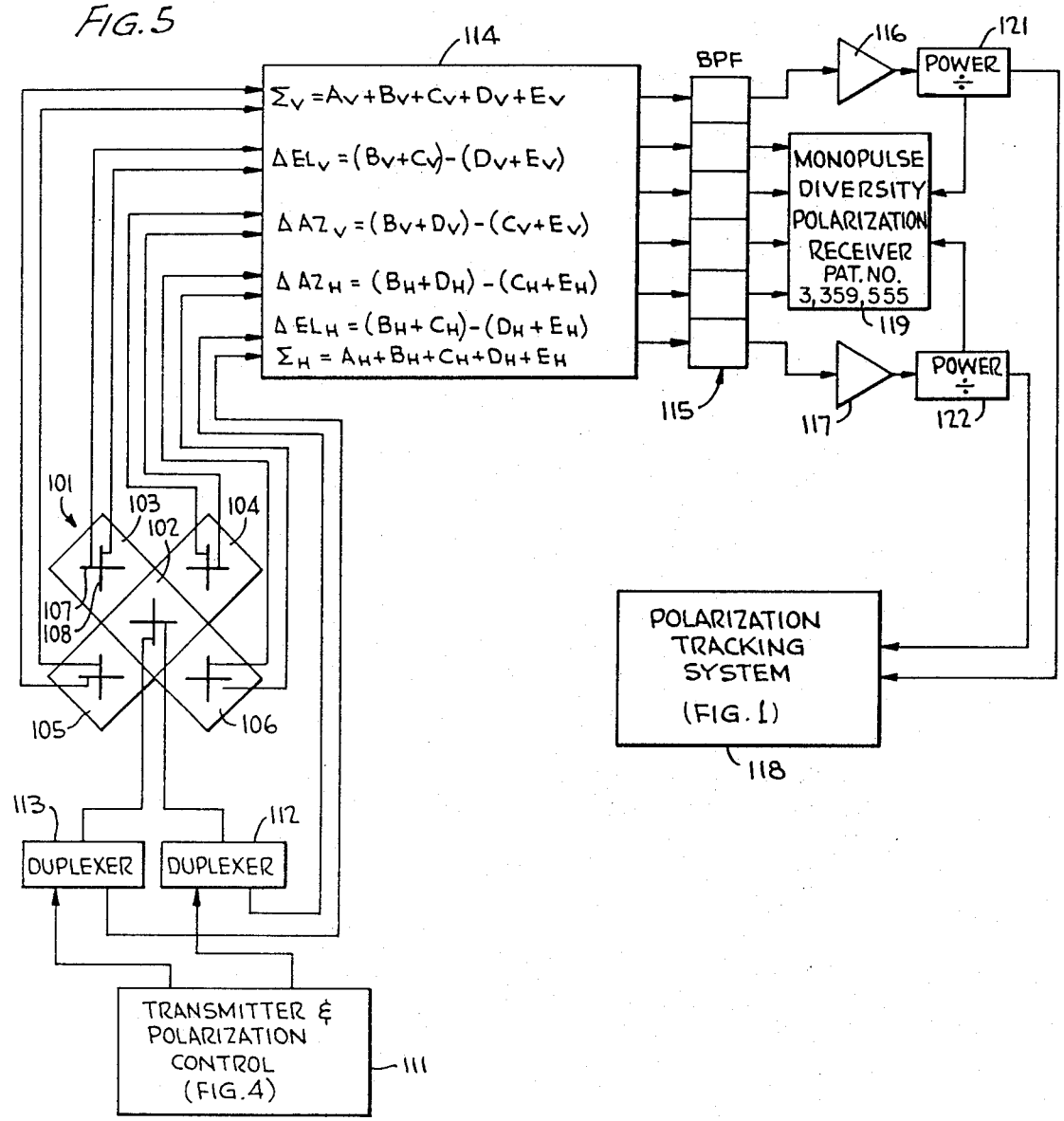

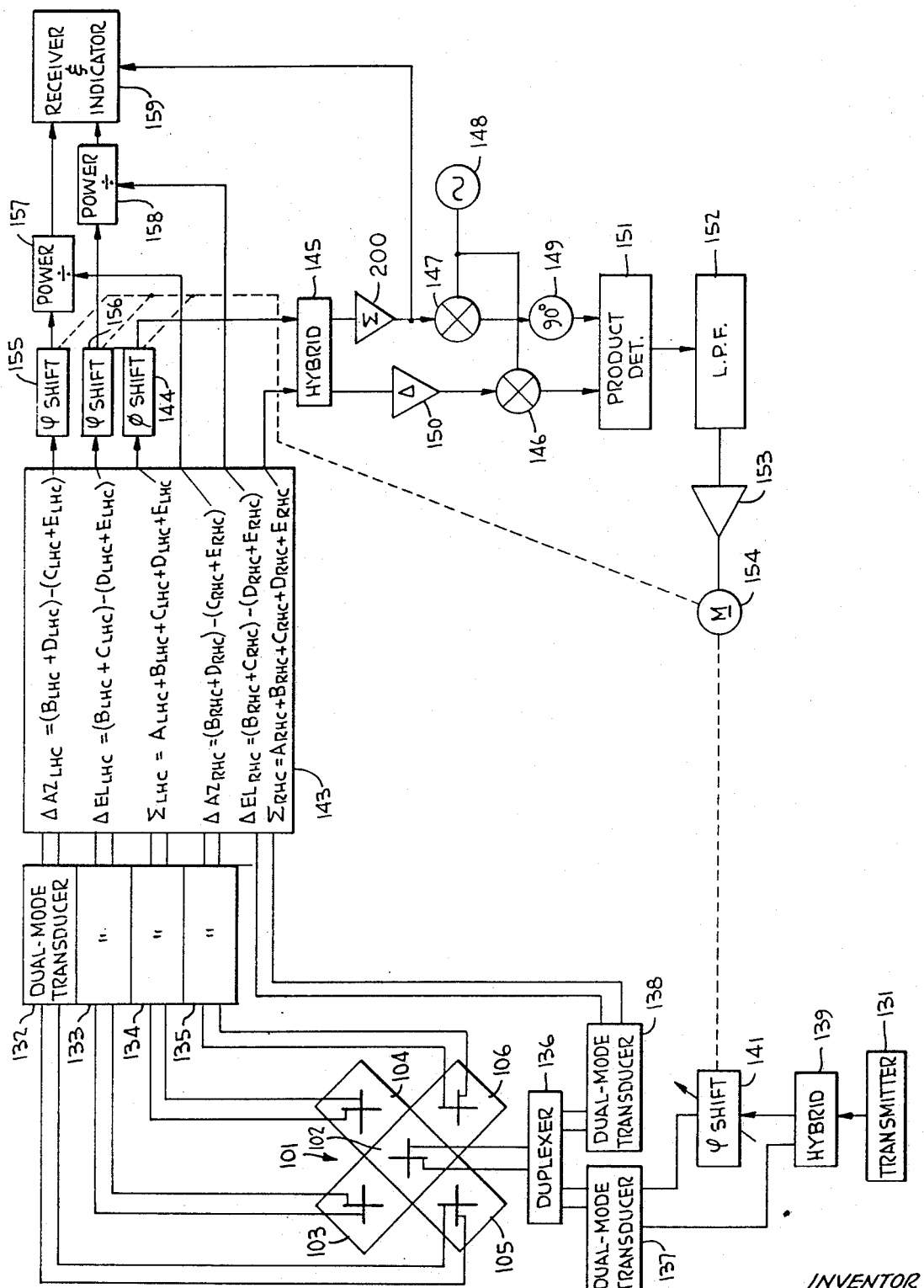

ABSTRACT OF THE DISCLOSURE

The polarization tilt angle of linearly polarized electromagnetic waves is determined by converting the linearly polarized waves into a pair of oppositely sensed circularly polarized waves, having a relative electrical phase difference indicative of the polarization tilt angle. The phase difference between the circularly polarized waves is determined with a feedback network including a phase shifter responsive to one of the circularly polarized waves and a detector for deriving an output indicative of the ratio of the difference of the phase shifted and other circularly polarized waves to the sum of the phase shifted and other circularly polarized waves. A system for at will controlling the polarization directions of circularly and linearly polarized electromagnetic waves, as well as the major and minor axes of elliptical polarized waves, includes a pair of hybrids, the first of which is driven with waves of reference and variable phase. A sum output port of the first hybrid is coupled through a variable phase shifter to a port of the second hybrid, while a difference output of the first hybrid is coupled to another port of the second hybrid. The second hybrid responds to the inputs thereof to drive a pair of orthogonal linear feeds. The transmitter and receiver are combined with a five-element monopulse antenna array and a monopulse diversity polarization receiver. A monopulse array is driven by a linearly polarized wave, the polarization tilt angle of which is controlled in response to a polarization receiver responsive to right and left-hand circularly polarized energy derived from the monopulse array.

ORIGIN OF THE INVENTION

The invention described herein was made by an employee of the United States Government and may be manufactured and used by or for the Government for governmental purposes without the payment of any royalties thereon or therefor.

The present invention relates generally to electromagnetic polarization systems and, more particularly, to a polarization system wherein left and right-hand circular polarizations are excited by a network including a phase shifter and a hybrid.

To attain the greatest possible signal to noise ratio in electromagnetic signal links between space probes and ground stations, it is frequently necessary to align the polarization direction of received electromagnetic waves with elements in an antenna array responsive to the waves. In the past alignment has been usually achieved by physically rotating feed elements within a receiving antenna. The difficulties in physically rotating a feed, which may be a relatively massive member and suspended in space above an antenna reflector, are apparent. In addition, it has been found that the feed cannot generally be rotated in a precise manner, and exactly along an antenna boresight axis, whereby a material error exists with the prior art system.

In accordance with one aspect of the present invention, the orientation angle of a feed is effectively rotated so that it is aligned with the polarization direction, or tilt angle, of the received energy by converting orthogonal, linearly polarized electromagnetic components into left and right-hand circularly polarized waves. The phase difference between the left and right-hand circularly polarized waves provides a measure of the orientation angle of the linearly polarized wave such that $$\Theta_0 = \frac{\Delta \Phi}{2}$$

where:

$\Delta\Phi$ = the relative electrical phase difference between the left and right-hand circularly polarized waves, and
$\Theta_0$ = the orientation tilt angle of the received linearly polarized wave relative to a reference axis.

The phase angle is measured with a network including a variable phase shifter responsive to one of the circularly polarized waves and a hybrid network for deriving signals indicative of the vector sum and difference of the phase shifted and unmodified, i.e., reference, circularly polarized waves. The ratio of the vector difference to the vector sum is derived to control the phase shifter so that the phase shifter output is phase aligned with the reference circularly polarized wave. It has been found that this particular combination provides extremely accurate tracking information indicative of polarization orientation angle.

In accordance with another aspect of the invention, the direction and type of polarized electromagnetic energy derived from a transmitter is selectively controlled to be linearly polarized at any angle, left or right-hand circularly polarized, or elliptically polarized in either direction, with major and minor axes control. The polarization transmission control network includes a pair of hybrids, the first of which is excited at a pair of input ports with energies having variable phase differences, which determine the transmission polarization mode. A second phase shifter connects the hybrids together to determine the orientation angle of the linear and elliptically polarized energy transmitted.

The system of the present invention, employing a pair of hybrids, is superior to prior art systems which usually have employed, for the same purpose, radio frequency switches. R.F. switches are generally to be avoided in high power applications, such as are usually required in space transmitters, because they have generally been found to be unreliable and cause operational difficulties. In the event that it is desired to change the transmission polarization mode, an operation requiring activation of the switch from one state to another, a transmitter feeding the switch must be deenergized, causing the loss of valuable operational time and data.

Another problem with prior art systems for controlling polarization direction is the inability to control polarization direction, except in discrete steps. In particular, prior art systems utilizing R.F. switches have been capable of transmitting linearly polarized waves in only two distinct polarization directions, at right angles to each other. Similarly, the transmission of elliptically polarized waves has been possible such that the major axes can be directed in only two directions, orthogonal to each other. By utilizing the system of the present invention, wherein R.F. switches are not required, linear polarization in any direction can be achieved, while the major axis direction of elliptically polarized waves can be varied at will.

In accordance with another aspect of the present invention, the polarization transmitting and tracking systems are combined with a monopulse type array, adapted to derive signals indicative of vertically and horizontally polarized energy impinging on the array. The polarization tracking system responds to indications of the total energy impinging on the monopulse array in the vertical and horizontal polarization directions. These signals are coupled to the tracking system through a pair of relatively high gain, stable parametric amplifiers which also feed a monopulse diversity polarization receiver of the type disclosed in my copending application, Ser. No. 576,521, filed Aug. 30, 1966 (now Pat. No. 3,359,555), and commonly assigned with the present application. By amplifying the signals indicative of the total vertically and horizontally polarized energy before the equal power division of signals to the monopulse receiver and the polarization tracking receiver, a 3 decibel loss in signal to noise ratio is avoided.

The polarization tracking system of the invention is utilized in conjunction with the transmitter for driving the monopulse feed so that the polarization direction of energy transmitted from the feed is controlled to an angle which achieves optimum signal to noise ratio. Control of the polarization direction transmitted from the feed to a space probe is important because the probe usually includes a transponder for automatically shifting the polarization direction of energy transmitted therefrom by a fixed amount relative to energy received by it. Hence, the present invention enables the monopulse array elements to be aligned with receiver and transmitter elements comprising a relatively low power spacecraft transponder to provide optimum signal strength.

The universal polarization control network of the present invention is particularly adapted for use with the monopulse diversity polarization receiver disclosed in the aforementioned application because said receiver is adaptable for use in conjunction with energy in any polarization mode or direction. If it is found that fading in one polarization direction and/or mode is occurring over long time intervals, as can be ascertained from the output of the monopulse diversity polarization receiver, the polarization angle and/or mode of energy transmitted from the monopulse array to the transponder and back to the array can be varied at will at the ground station with the polarization control network.

In accordance with still another aspect of the invention, a polarization tracking receiver of the type specified supra is responsive to left and right-hand circularly polarized waves respectively indicative of the total energy in each polarization direction impinging on a monopulse array. The polarization tracking receiver includes a phase measuring system comprising a phase shifter driven by a feedback servoloop output, a sindicated supra. Synchronized with the phase shifter setting responsive to the signal indicative of the total energy in one of the circularly polarized wave directions is an additional pair of phase shifters, respectively responsive to azimuth and elevation position indicating difference signals derived for said one circular polarization direction. The phase of the azimuth and elevation signals for said one polarization direction is thereby adjusted in a like manner to the signal indicative of total energy in the polarization direction specified. The azimuth and elevation signals are therefore brought into phase alignment with the azimuth and elevation signals of the other circular polarization direction and can be linearly combined to provide signals having a greater signal to noise ratio.

Another feature of a monopulse system utilizing the polarization tracker of the present invention is that the polarization direction of transmitted linearly polarized energy can be controlled automatically in response to the output of the feedback network driving the phase shifters responsive to the monopulse signals. The transmitted energy polarization direction is controlled to be offset by a predetermined spatial angle relative to the received energy to provide optimum tracking of the spacecraft signal.

It is, accordingly, an object of the present invention to provide a new and improved wave polarization system and method.

Another object of the invention is to provide a new and improved system and method for determining the polarization direction of wave energy.

An additional object of the invention is to provide a new and improved system for controlling the transmission angle and/or polarization type of wave energy.

A further object of the invention is to provide a new and improved system for enabling linearly, circularly and elliptically polarized wave energy to be derived at will.

Yet another object of the invention is to provide a system for at will transmitting universally polarized energy, i.e., linearly polarized waves in any direction, circularly polarized waves in either direction, and elliptically polarized waves having major axes in any desired orientation.

Still an additional object of the present invention is to provide a system and method for measuring the orientation angle of linearly polarized electromagnetic energy, wherein the energy is transformed into left and right-hand polarized waves having variable phase indicative of orientation angle and the phase is measured in a manner enabling more accurate indications of polarization orientation angle to be derived than in prior art systems.

A further object of the present invention is to provide a system for controlling the direction of energy transmitted from a feed in response to the orientation angle of received energy.

Still another object of the invention is to provide a new and improved polarization tracking system, in combination with a monopulse feed.

Yet an additional object of the invention is to provide, in combination with a monopulse tracking system, means for driving in parallel a system for determining the polarization angle of received linearly polarized energy and a monopulse diversity polarization receiver.

Still yet an additional object of the invention is to provide a monopulse receiver wherein greater signal strength of received angular indicating signals is provided by aligning right and left-hand polarized waves so that they can be combined.

The above and still further objects, features and advantages of the present invention will become apparent upon consideration of the following detailed description of several specific embodiments thereof, especially when taken in conjunction with the accompanying drawings, wherein:

FIG. 1 is a block diagram of a preferred embodiment of a linear polarization tracker in accordance with the present invention;

FIGS. 2A–2D are waveforms useful in describing the operation of the system of FIG. 1;

FIG. 3 is a plot indicating the performance of a tracker of the type shown by FIG. 1;

FIG. 4 is a circuit diagram of a preferred embodiment of a system for selectively controlling the polarization direction and type of transmitted electromagnetic waves in accordance with the present invention; and FIGS. 5 and 6 are block diagrams of different embodiments of polarization tracking and transmitter systems particularly adaptable for use in conjunction with monopulse systems.

Reference is now made to FIG. 1 wherein an antenna 11 is illustrated as comprising a pair of crossed dipoles 12 and 13, having their crossing points and centers coincident with the focal point of reflector 14, whereby excitation patterns thereof are the same and symmetrical relative to the reflector boresight axis 17. Dipoles 12 and 13 are positioned at right angles with respect to each other, having their longitudinal axes aligned with the reflector horizontal and vertical axes 16 and 18. Due to the relative position of dipoles 12 and 13, the instantaneous amplitude of the energy inducted in each of them is proportional to the polarization direction of linearly polarized electromagnetic energy exciting antenna 11. Consider the situation of linearly polarized electromagnetic energy depicted by arrow 15, displaced by a tilt angle $\Theta_0°$ from horizontal axis 16 and having a magnitude E, as such a wave is directed to reflector 11 along boresight axis 17. The voltage magnitudes $E_1$ and $E_2$ respectively induced in dipole elements 12 and 13 in response to vector 15 are represented as projections of the vector on horizontal axis 16 and vertical axis 18 and are therefore represented by:

$$E_1 = E \cos \Theta_0 \quad (1)$$

and $$E_2 = E \sin \Theta_0 \quad (2)$$

The linearly polarized voltages induced in dipoles 12 and 13 are converted into a pair of oppositely rotating, circularly polarized electromagnetic waves by network 21. Network 21 includes a fixed, 90° phase shifter 22 responsive to the signal induced in vertical dipole 13. The phase shifted output of network 22 is combined with the signal derived from horizontally disposed dipole 12 in hybrid 23, which is preferably of the one-quarter-three-quarter wave length coaxial type. The input signals to hybrid 23 are fed to ports 24 and 25, displaced from each other by one-half wave length of the energy for which antenna 11 is adapted to receive. The outputs of hybrid 23, at ports 26 and 27, are directly proportional to the vector sum and difference of the electromagnetic waves at ports 24 and 25, hence, are represented by:

$$\sum\nolimits_{LH} \underline{/\Delta\Phi} = \frac{e^{-j\beta}}{\sqrt{2}}(E_2 - jE_1) \quad (3)$$

$$\sum\nolimits_{RH} \underline{/0} = \frac{e^{-j\beta}}{\sqrt{2}}(E_2 + jE_1) \quad (4)$$

where:

$\sum_{LH} /\Delta\Phi =$ the voltage at port 26, $\sum_{RH} /0 =$ the voltage at port 27, and $\beta =$ RF phase.

The $\Sigma_{LH}$ and $\Sigma_{RH}$ vectors derived from ports 26 and 27 are respectively left-hand and right-hand circularly polarized waves having a phase displacement, $\Delta\Phi$, equal to twice the polarization angle of vector 15 from a reference axis which corresponds with horizontal axis 16; hence $\Delta\Phi = 2\Theta_0$.

Hybrid 23, as well as the other hybrids disclosed herein, are preferably of the one-quarter-three-quarter coaxial RF type, although other equivalent circuits can be employed such as a waveguide magic tee.

The hybrid has reciprocal and bilateral properties described as follows. When voltage vectors A and B are respectively applied at hybrid ports 24 and 25, the outputs, C and D, at ports 26 and 27 respectively become $$C = A + Be^{j\Phi}$$
$$D = A - Be^{-j\Phi}$$

where $j = \sqrt{-1}$, the complex operator, and
$\Phi =$ electrical phase difference between vectors A and B.

Because of the reciprocal, bilateral nature of hybrids, if the vectors A and B are instead applied to ports 26 and 27, respectively, the outputs at ports 25 and 24 also equal $$C = A + Be^{j\Phi}$$
$$D = A - Be^{-j\Phi}$$

Furthermore, ports 26 and 27 are electrically isolated from each other, while ports 24 and 25 are also isolated from each other. In addition, if there is only one vector input (A) at port 26, the power in input A equally divides between ports 24 and 25. Similarly, if there is only one input (B) at port 27, the power in input B equally divides between ports 24 and 25.

To provide a physical analysis of the manner by which the polarization angle, $\Theta_0$, of the linearly polarized electromagnetic wave represented by vector 15 is related to the phase difference between the left and right circularly polarized energies, respectively considered as being of variable and references phases, derived from ports 26 and 27, consider the wave forms of FIGS. 2A–2D.

In FIG. 2A, it is assumed that the polarization tilt angle of vector 15 is 0°, as shown by vector representations 31 and 32, at the 12 o'clock position. The vectors 31 and 32 actually represent the same linear polarization vector. The vector is transformed into a pair of oppositely rotating circularly polarized components 33 and 34 which are vertically aligned at identical time periods, when each of them has a peak maximum amplitude represented by the 12 o'clock position; the 3 and 9 o'clock positions indicate zero amplitudes, while the 6 o'clock position is commensurate with a negative peak value. As time progresses, the left-hand component of vector 31 rotates as indicated by arrow 33 while the right-hand component of vector 32 rotates in the direction indicated by arrowhead 34. The rotational velocities of arrows 33 and 34 are determined by the frequency of the energy induced in dipoles 12 and 13, so that one cycle of the electromagnetic energy corresponds with a 360° rotation of the arrows. After one quarter of a cycle, the left and right-hand components 33 and 34 have zero values, at the 9 and 3 o'clock positions respectively. After another quarter of a cycle, one-half cycle after left and right-hand components 33 and 34 were originally aligned at the peak maximum value, the oppositely rotating components are again aligned at the 6 o'clock position. After completion of still another quarter of a cycle, components 33 and 34 are rotated to the 3 and 9 o'clock positions respectively, where they both have zero amplitudes. After a further quarter of a cycle, components 33 and 34 are again aligned at a positive maximum. The circular representations of the rotating components can be transformed into sinusoidal amplitude versus time wave forms 35 and 36, respectively. From wave forms 35 and 36, it is evident that an inphase relationship exists between the left and right-hand circular components of vectors 31 and 32 at all times, even though the components are rotating in opposite directions. Hence, for the polarization orientation $\Theta_0 = 0$, the phase difference of the left-hand and right-hand circularly polarized waves, $\Delta\Phi$, equals 0°.

Now consider the situation wherein the orientation angle of the vector 15 is displaced from the horizontal axis 16 by 45°, $\Theta = 45°$, as represented in FIG. 2B. Under these circumstances, the linearly polarized energy is represented by vector 37, FIG. 2B, displaced from the 12 o'clock position by 45° in the counter clockwise direction. Vector 37 can be represented by rotating left and right-hand components 39 and 40, respectively. When component 39 has rotated counter clockwise 45° to a zero amplitude position, at the 9 o'clock position, component 40 has rotated to the maximum amplitude position, at the 12 o'clock position. As time progresses through another quarter of a cycle, component 39 has rotated to the 6 o'clock position, while component 40 is at a 3 o'clock position. At these positions, the amplitude of component 39 is a maximum negative, while the amplitude of component 40 is zero. Hence, a 90° phase displacement exists between components. The 90° phase relationship between components 39 and 40 is also shown by sinusoids 42 and 43, transformations of left and right-hand circularly polarized wave components 39 and 40 into amplitude versus time plots. From the foregoing, a displacement of $\Theta_0 = 45°$ for vector 15 from the horizontal axis results in a phase displacement of the left and right-hand circularly polarized waves derived from ports 26 and 27 of 90°.

Next consider that vector 15 is aligned with vertical axis 18, whereby $\Theta_0 = 90°$, as shown by vector 38, in FIG. 2C. From FIG. 2C, linearly polarized vector 38 is transformed into left and right circularly polarized components 44 and 45 having equal amplitudes and directivities when they both have zero amplitudes, at the 9 o'clock position. As time progresses, component 44 rotates in the left direction, while component 45 rotates to the right. After a quarter cycle, components 44 and 45 are respectively downwardly and upwardly oriented, and are therefore 180° phased displaced from each other. After another quarter of a cycle has elapsed, both components 44 and 45 are at the 3 o'clock position, hence, have zero amplitudes. As time progresses through another quarter of a cycle, however, components 44 and 45 are in the 6 and 12 o'clock positions so that a positive maximum of the left-hand component occurs while the right-hand component has a negative maximum. A transformation of rotating wave components 44 and 45 into an amplitude versus time representation is shown by sinusoidal wave forms 46 and 47, which illustrate the 180° or out-of-phase relationship between the left-hand and right-hand circularly polarized waves if $\Theta_0=90°$.

Next consider the situation of FIG. 2D, wherein vector 15 is aligned with horizontal axis 16, but points in the opposite direction from the originally designated $\Theta_0=0$ orientation. Under these circumstances, the linear vector is resolved into counter clockwise and clockwise rotating components 48 and 49 that have simultaneously the same value at the 6 o'clock position. As time progresses, components 48 and 49 rotate in opposite directions but are maintained at the same amplitudes at all times, as shown by the transformations thereof into the sinusoidal amplitude versus time plots 50 and 51. Hence, for a vector orientation of $\Theta_0=180°$, the phase displacements between the left and right-hand circularly polarized waves at ports 26 and 27 is 0°.

From FIGS. 2A–2D, it is seen that the relative phase angle of the left-hand and right-hand circularly polarized waves to the orientation direction of the linearly polarized wave 15 is accurately represented by $\Theta_0=\Delta\phi/2$ While this relationship can also be proven mathematically, a formal derivation thereof is not deemed necessary for a complete understanding of the invention.

FIGS. 2A and 2D reveal that an ambiguity exists between the phase angle, $\Delta\Phi$, and polarization orientation angle, $\Theta_0$. In particular, the orientation angles $\Theta_0=0°$ and $\Theta_0=180°$ both result in left and right-hand circular polarization phase displaceent of 0°. This ambiguity, however, need not be resolved since it is necessary only to determine the plane of the polarized energy and not the pointing direction of energy in a plane. In other words, to track the polarization direction of linearly polarized electromagnetic energy for optimum reception, it is necessary only to align the antenna axis with the wave energy polarization direction, regardless of the phase of the energy in that direction.

In accordance with the present invention, the effective orientation angle of dipoles 12 and 13 is adjusted so as to be aligned with vector 15 for all values of $\Theta_0$ with about 1° orientation error by measuring the relative phases of the RF energy at ports 26 and 27 with a feedback arrangement including a controllable phase shifter and a network for determining the ratio between the difference and sum of the two circularly polarized components derived at ports 26 and 27. To this end, the variable phase, left-hand circularly polarized energy at port 26 is feed through variable phase shifter 61, FIG. 1. The phase shift introduced by element 61 is controlled by a feedback loop including motor 262 that varies the phase setting of phase shifter 61. Motor 262 is activated so that the phase shift introduced by element 61 causes the left-hand circularly polarized wave derived by the phase shifter to be phase aligned with the right-hand circularly polarized wave derived from port 27.

The output of phase shifter 61 is combined with the right-hand circularly polarized energy at port 27 in hybrid 62, of the same type as hybrid 23. The energy at port 27 of hydrid 23 is coupled to port 63 of hybrid 62, while the left-hand circularly polarized energy derived from phase shifter 61 is supplied to port 64 of hybrid 62. The energies fed to ports 63 and 64 are vectorially added at port 65, displaced by one-quarter wave length from each of ports 63 and 64. The vector difference of the energies coupled to ports 63 and 64 is derived at port 66, respectively one-quarter and three-quarters of a wave length from ports 63 and 64.

The sum and difference signals derived from port 65 and 66 are respectively fed to low-nose type RF amplifiers 67 and 68, having outputs heterodyned with a stable frequency output of local oscillator 69 in mixers 71 and 72. Mixers 71 and 72 derive IF outputs having identical relative phase and amplitude relationships as the RF signals at ports 65 and 66. The IF outputs of mixers 71 and 72 are fed through IF amplifiers 73 and 74 to product detector 75, with the former connection being via fixed 90° phase shifter 76.

Product detector 75 responds to the input signals thereof to derive a D.C. voltage indicative of the ratio of the difference representing output signal of amplifier 74 relative to the sum representing output signal of amplifier 73. The ratio signal derived by detector 75 is coupled through low pass filter 77 which removes the high frequency modulation products and integrates the ratio signal. The output of low pass filter 77 is fed to servo network 78, having an output which actuates motor 262 to adjust the phase shift introduced by element 61. In addition, motor 262 drives a low inertia shaft encoder 79, which is preferably of the optical encoder type. Encoder 79 feeds an output signal to decoder 81, for providing a visual signal indicative of the vector orientation, $\Theta_0$, of linearly polarized wave 15.

To minimize differential phase shifts and thereby provide accuracy to the system of the present invention, each of the RF components and the controls therefor is located physically at antenna 11. Only the IF processing circuitry, comprising mixers 71, 72, local oscillator 69, amplifiers 73, 74, phase shifter 76, product detector 75, and low pass filter 77, as well as decoder 81, is not mounted in antenna 11.

In operation, the phase measuring loop maintains the difference vector derived from port 66 at zero amplitude, whereby the left and right-hand circularly polarized waves fed to ports 63 and 64 of hybrid 62 are of identical phase. The amount of phase shift introduced by element 61 thereby provides a measure of the angle $\Delta\Phi$ correlated with the polarization orientation angle, $\Theta_0$, by $\Theta_0=\Delta\Phi/2$, as indicated supra. It has been found through actual tests that the maximum error in the polarization direction indication with a system of the type shown in FIG. 1 is .65° over a complete 360° possible field of view. Throughout a significant portion of the angular range, the error relationship is linear, hence, can be calibrated in a facile manner with encoder 81.

A plot of the actual performance of a typical system of the type illustrated by FIG. 1 is shown in FIG. 3, wherein the polarization orientation angle $\Theta_0$ is represented along the $x$ axis, while the electrical phase difference of the left and right-hand circularly polarized waves is plotted along the $y$ direction. In FIG. 3, the ideal performance of the polarization tracker is shown by solid line 82 over a 90° span, while the actual performance of a system of the type illustrated by FIG. 3 is shown by dashed region 83. For the other three quadrants, the system performance is substantially the same as shown in FIG. 3. The difference between curves 82 and 83 is easily compensated by appropriately adjusting the response of encoder 81. Error that cannot be compensated, due to unpredictable, differential gain and phase characteristics of various components in the system, is shown by the width of region 83. This uncompensatable error is limited to 0.6 tilt electrical degrees, hence a physical angle of ±0.3°, and is appreciably less over most of the range.

Reference is now made to FIG. 4 of the drawings wherein there is illustrated a circuit diagram of a system for controlling the polarization of transmitted electromagnetic energy. The system of FIG. 4 has universal variability, in that it is able to transmit linearly polarized energy in any direction, circularly polarized energy in either the left or right-hand direction, or elliptically polarized energy having control of major axis position over a 360° range.

The antenna of FIG. 4 is identical to that of FIG. 1, including horizontally and vertically directed dipoles 12 and 13, as well as reflector 14. As such, antenna 11 is excited by dipoles 12 and 13 with linearly polarized electromagnetic waves displaced in space by 90° at any instant. Left and right-hand circular polarization excitations for dipoles 12 and 13 are derived with fixed 90° phase shifter 22 and hybrid 23 in exactly the same manner as indicated supra in conjunction with FIG. 1, in accordance with the theory of reciprocity.

The left and right-hand circularly polarized waves exciting ports 26 and 27 of hybrid 23 are generated by transmitter 91, having an output which drives power divider 92. Energy at the output ports of power divider 92 is at substantially identical phase and amplitude, 3 db less than the energy generated by transmitter 91. One output of power divider 92 is coupled directly to port 93 of R.F. hybrid 94. Port 95 of hybrid 94, removed from port 93 by one-half wavelength, is excited by the other output of power divider 92 as coupled through variable phase shifter 96. Hybrid 94 includes a pair of output ports 97 and 98, the first of which is one-quarter wave length phase displaced from each of ports 93 and 95, while the second is phase displaced from ports 93 and 95 by three-quarter and one-quarter wave lengths, respectively. Hence, energies coupled to ports 97 and 98 are respectively the vector sum and difference of the energies coupled to ports 93 and 95. Port 98 is directly coupled to port 27 of hybrid 23, while port 97 is coupled to port 26 via variable phase shifter 99.

The amount of phase shift introduced by phase shifters 96 and 99 is controlled by programmer 101 and determined by the type and/or orientation angle of the electromagnetic energy desired to be transmitted from antenna 11. In general, the phase shift introduced by element 96 determines the type, i.e., linear, circular, or elliptical, of polarized wave transmitted from antenna 11, while the amount of phase shift introduced by element 99 controls the wave energy polarization direction. In particular, phase shifts of 0, 90 and 180 degrees by phase shifter 96 result in the derivation of left circular, linear, and right circular polarized waves from antenna 11, respectively. For the 0 and 180 degree settings of phase shifter 96, the setting of phase shifter 99 is arbitrary, as the left and right-hand circularly polarized waves are derived separately at output ports 97 and 98 of hybrid 94. For the 90 degree setting of phase shifter 96, the phase angle displacement introduced by phase shifter 99 determines the direction angle of linearly polarized energy transmitted from antenna 11. For a $\Delta\Phi/2$ degree polarization displacement of the transmitted, linearly polarized energy occurs; by reciprocity from FIGS. 1 and 2, the expected result.

With a setting for phase shifter 96 of between 0 and 90°, left-hand elliptically polarized waves are transmitted from antenna 11, while right-hand elliptically polarized waves are transmitted from the antenna for a phase shifter setting of between 90 and 180 degrees. The direction angle of the major or minor axes of the elliptically polarized waves derived from antenna 11 is controlled by phase shifter 99 in somewhat the same manner as the phase shifter determines the polarization direction of the linearly polarized waves. Thereby, a 180° change in the setting of phase shifter 99 results in a 90° rotation of the major and minor axes of the elliptically polarized electromagnetic energy.

To consider the manner by which the system of FIG. 4 functions, initially assume that the setting of phase shifter 96 is 0°. Under these conditions, all of the energy of transmitter 91 is fed to port 97 and no energy is coupled to port 98, whereby left-hand circularly polarized input port 26 of hybrid 23 is excited to the exclusion of right-hand circularly polarized input port 27. In response to only port 26 being excited, energies having equal amplitudes and phases are derived at ports 25 and 24. The energy at port 25 is fed through 90° phase shifter 22 to vertically oriented dipole 13, while the energy at port 24 is fed directly to horizontally oriented dipole 12. In response to the 90° electrical phase displacement of the energy fed to dipoles 12 and 13 and the 90° spatial displacement of the dipoles, left-hand circularly polarized energy is derived from antenna 11.

By a similar process, a 180° setting of phase shifter 96 results in excitation of output port 98 to the exclusion of port 97 of hybrid 94. Thereby, the right-hand circularly polarized input port 27 of hybrid 23 is excited to the exclusion of left-hand input port 26 and right-hand circularly polarized energy is transmitted from antenna 11.

With a 90° setting of phase shifter 96, energies derived at ports 97 and 98 are proportional to the vector sum and difference of orthogonally phased energies fed to ports 93 and 95. The energies at ports 97 and 98 are thereby phase displaced 90° relative to each other and are equal because the attenuating properties of the paths between the transmitter and the two ports are substantially the same.

For a 0° setting the phase shifter 99, the left and right-hand input ports 26 and 27 of hybrid 23 are excited with voltages displaced in phase by 90° from each other. In response to the 90° phase displacement between the inputs to ports 26 and 27, dipoles 12 and 13 are excited whereby antenna 11 derives linearly polarized electromagnetic energy having an orientation angle $\Theta_0 = 45°$, as seen from FIG. 2B. Next consider the situation wherein the setting of phase shifter 99 is $+90°$. Under these circumstances, the 90° phase displaced energies derived from ports 97 and 98 are fed to ports 26 and 27 with the same phases. Dipole elements 12 and 13 respond to the resulting outputs of hybrid 23 to derive linearly polarized energy having its orientation angle aligned with horizontally disposed dipole 12.

For a setting of phase shifter 99 equal to 180°, the energies coupled to ports 26 and 27 are 90° phase displaced. The 90° phase displacement between the energies coupled to ports 26 and 27, is however 180° phase reversed from the originally assumed condition wherein the setting of phase shifter 99 was zero degrees. With a setting of phase shifter 99 equal to 180°, the elements of antenna 11 are excited so that a linearly polarized wave having an orientation angle of $\Theta_0 = -45°$ is derived. From the foregoing, it is believed apparent that a change in the setting of the phase shifter 99 is reflected in the orientation direction of linearly polarized transmitted energy by $\Delta\Phi = 2\Delta\Theta$, where:

$\Delta\Phi$ is the phase shift change for element 99, and
$\Delta\Theta$ is the orientation angle change of the linearly polarized transmitted energy.

Consideration will now be given to the manner by which the system of FIG. 4 functions to derive elliptically polarized electromagnetic energy. To derive elliptically polarized energy, the setting of phase shifter 96 is such that the energies coupled to ports 93 and 95 of hybrid 94 have a phase relationship other than inphase, out of phase or quadrature. Thereby, the voltages at ports 97 and 98 have differing amplitudes, dependent upon the amount of phase shift introduced by element 96. This relationship is to be compared with the other settings of phase shifter 96 wherein the voltages at ports 97 and 98 are equal, or one port derives a zero amplitude output.

In response to the finite, differing amplitude voltages derived from ports 97 and 98, elliptically polarized waves are derived by phase shifter 99, hybrid 23 and antenna 11. The orientation angle of the major and minor axes of the elliptially polarized waves is deterined by the setting of phase shifter 99. The relationship between the axes of the elliptically polarized waves and phase shifter 99 can be realized by considering linearly polarized waves as a specific type of elliptically polarized waves having a minor axis amplitude of zero and by reviewing the manner by which phase shifter 99 controls the orientation direction of linearly polarized waves transmitted from antenna 11. The relationship holds whereby a change of $\Delta\Phi$ in the setting of phase shifter 99 results in a variation of $\Delta\theta/2$ in the major axis direction angle of elliptically polarized waves derived from antenna 11.

Reference is now made to FIG. 5 of the drawings wherein there is illustrated a block diagram of a monopulse tracking system employing the polarization tracker of FIG. 1 and the variable polarization transmitter of FIG 4, in combination with a monopulse diversity polarization receiver of the type disclosed in my aforementioned copending application. In the system of FIG. 5, the single crossed dipole arrangement of FIGS. 1 and 4 is replaced by a monopulse feed 101 including a centrally located radiating element 102, about which are orthogonally and symmetrically positioned radiating elements 103–106. Each of radiators 102–106 is illustrated as including a pair of crossed dipoles 107 and 108 for respectively deriving signals in response to energy in the horizontal and vertical planes. While each of radiating elements 102–106 is illustrated, for purposes of convenience, as including a pair of crossed dipoles, it is to be understood that each radiating element preferably comprises a square horn including excitation probes for the horizontal and vertical directions. The center of array 101, at the center point of the aperture of element 102, is located at the focal point of a reflector system so that the individual lobe derived from each of radiating elements 102–106 has substantially the same shape.

For the purposes of convenience, the responses associated with the radiating elements of feed 101 are denominated as A–E for the radiating elements 102–106 respectively. Responses in the horizontal plane, along dipole 107, are indicated by subscripts denominated as H, while responses in the vertical plane, along dipole 108, are indicated by subscripts V. Responses indicative of the position of a target in the elevation and azimuth planes carry the subscripts EL and AZ, respectively. The positions of targets in the elevation and azimuth planes are to be distinguished from the polarization direction of the electromagnetic waves, which may be arbitrary and are not necessarily related to elevation and azimuth angles.

For the transmission mode, centrally located radiating element 102 of monopulse feed 101 is excited to any arbitrary polarization, in response to the output of transmitter and polarization control network 111. Transmitter and polarization control network 111 is identical to the system disclosed by FIG. 4, except with regard to the feed connection. In FIG. 5, the output of network 111 corresponding with port 24 of hybrid 23 is fed to horizontal feed element 107 of radiating element 102 via duplexer 112, while the output of 90° phase shifter 22 is fed to the vertical feed element 108 via duplexer 113. Feed elements 107 and 108 of radiator 102 respond to the outputs of duplexers 112 and 113, as coupled from control network 111, to derive a radiation pattern which may be linearly polarized in any direction, circularly polarized in either direction, elliptically polarized in either direction and with any desired orientaton of the major and minor axes.

Typically, control network 111 excites radiator 102 with microwave energy in the frequency range 1.75 to 1.85 gHz. The energy is transmitted to an object being tracked, such as a space vehicle, which includes a transponder for relaying back to array 101 a signal at a frequency displaced from the transmitted frequency. A typical frequency in the link from the transponder to array 101 is in the range 2.2 to 2.3 gHz.

The signal transmitted by the transponder back to array 101 illuminates the various elements of the array in differential manner to enable indications of the target location to be derived. Each of the feed elements in radiators 102–106 of array 101 is excited to derive indications of the signal strength in the horizontal and vertical polarization directions. The signals transduced by feed elements 107 and 108 of radiating elements 103–106 are fed directly to a monopulse combining network 114, while the horizontal and vertical polarizations transduced by radiator 102 are fed to network 114 through duplexers 112, 113, respectively.

Network 114 responds to the input signals thereof to derive signals indicative of the azimuth and elevation angles of the target relative to the boresight axis of array 101, as transduced by the horizontally and vertically disposed feed elements 107 and 108, respectively. In addition, network 114 includes circuitry for deriving signals indicative of the total energy transmitted by the target to antenna 101 in each of the horizontal and vertical polarization directions. Network 114 responds to the signals transduced by the elements of monopulse array 101 to derive six output signals represented by:

$$\Delta_{AZV} = (B_v + D_v) - (C_v + E_v) \quad (5)$$

$$\Delta_{ELV} = (B_v + C_v) - (D_v + E_v) \quad (6)$$

$$\Sigma_v = A_v + B_v + C_v + D_v + E_v \quad (7)$$

$$\Delta_{AZH} = (B_H + D_H) - (D_H + E_H) \quad (8)$$

$$\Delta_{ELH} = (B_H + C_H) - (D_H + E_H) \quad (9)$$

$$\Sigma_H = A_H + B_H + C_H + D_H + E_H \quad (10)$$

where:

$\Delta_{AZV}$ is commensurate with the location of the target in the aximuth plane, as determined by the vertically oriented feed elements 108;

$\Delta_{ELV}$ is commensurate with the position of the target in the elevation plane, as determined in response to the energy level impinging up the vertically oriented elements 108;

$\Sigma_v$ = the total of the vertically polarized energy impinging upon the transducers of array 101 in response to the signal derived from the target being tracked;

$\Delta_{AZH}$ is commensurate with the location of the target in the azimuth plane, as determined by the horizontally oriented feed elements 107;

$\Delta_{ELH}$ is commensurate with the position of the target in the elevation plane, as determined in response to the energy level impinging upon the horizontally oriented elements 107; and $\Sigma_H$ = the total of the horizontally polarized energy impinging upon the transducers of array 101 in response to the signal derived from the target being tracked.

All six outputs of network 114 are applied individually to one of the six filters in bandpass filter array 115. Array 115 includes six identical bandpass filters, adapted to pass the frequency transmitted from the target to array 101 to the exclusion of the signal fed to the array by transmitter and polarization control circuit 111.

The target indicating signals responsive to the $\Sigma_v$ and $\Sigma_H$ outputs of network 114 are fed to parametric amplifiers 116 and 117, respectively. Amplifiers 116 and 117 have substantially identical phase and gain characteristics so that no differential effects between the relative amplitudes and phases of the inputs and outputs thereof subsist. Amplifiers 116 and 117 have sufficient gain to enable polarization tracking system 118, of the type illustrated by FIG. 1, as well as monopulse diversity polarization receiver 119, of the type mentioned in the aforementioned copending application, to be driven in parallel through power dividers 121 and 122.

Receiver 119, in addition to being responsive to the $\Sigma_V$ and $\Sigma_H$ signals derived at the output terminals of power dividers 121 and 122, is responsive to the elevation and azimuth direction indicating output signals of network 114, in both the vertical and horizontal polarization directions. As indicated in the copending application, receiver 119 responds to energy of any rotational polarization type or linearly polarized energy to provide accurate indications of target location, regardless of fading in any individual polarization direction.

To determine the polarization direction of energy transmitted from the target impinging on feed 101 and thereby provide optimum communications between the target and feed, polarization tracking system 118 is included. Polarization tracking system 118 responds to the $\Sigma_V$ and $\Sigma_H$ output signals of power dividers 121 and 122 in exactly the same manner as the polarization tracking system of FIG. 1. The output of power divider 121 is fed to 90° phase shifter 22 and then to port 25 of hybrid 23. The output of power divider 122 is fed directly to port 24 of hybrid 23. Depending upon the direction angle indicated by tracking system 118, the polarization of energy coupled from control network 111 to radiator 102 may be varied to provide an optimum polarization communication link between the target and the feed.

Reference is now made to FIG. 6 of the drawing wherein there is illustrated a block diagram of another embodiment of the present invention adapted for use in conjunction with a monopulse tracking system. In the system of FIG. 6, monopulse array 101 is essentially identical with the monopulse feed of FIG. 5. In consequence, the array of FIG. 6 drives the same outputs as the array of FIG. 5 and center radiating element 102 is driven in response to the output of transmitter 131. In the system of FIG. 6, however, the horizontally and vertically polarized energies transduced by elements 103–106 are converted into right-hand and left-hand circularly polarized energies by dual-mode transducers 132–135, respectively. Dual-mode transducers 132–135 thereby effectively perform the same function as fixed 90° phase shifter 22 and hybrid 23, FIG. 1. Each of dual-mode transducers 132–135 is essentially the same, and is preferably of the type disclosed in IRE Transactions on Microwave Theory and Techniques, July 1956, pages 181–183.

Because center feed element 102 is driven in both the transmission and receive modes, it is connected through duplexer 136 to a pair of dual-mode transducers 137 and 138, which are also of the types set forth in the IRE Transactions article. Dual-mode transducer 137 includes a pair of inputs respectively responsive to right and left circularly polarized energy derived from transmitter 131 and the 180° phase displaced output ports of hybrid 139. The left-hand circularly polarized energy derived from one of the output ports of hybrid 139 is coupled to one input of dual-mode transducer 137 through variable phase shifter 141, the setting of which is controlled in a matter described infra.

The right-hand and left-hand circularly polarized energies fed by hybrid 139 and phase shifter 141 to the input ports of dual-transducer 137 are coupled through duplexer 136 to excite radiating element 102 with a linear polarization at an angle determined by the setting of phase shifter 141. Duplexer 136 prevents coupling of the transmitted energy to transducer 138 by a filter included therein.

Energy transmitted from radiating element 102 is generally propagated to a target, where it is changed in frequency and polarization by a transponder and transmitted back to monopulse array 101. While the energy received at monopulse array 101 is at a predetermined frequency, it has an arbitrary polarization angle determined by the angular position of the target in space. Received energy transduced by radiating element 102 is coupled through duplexer 136 to dual-mode transducer 138 and is prevented from being coupled into transducer 137 by the duplexer filter. Transducer 138 responds to the horizontally and vertically polarized energy picked up by radiator 102 and converts it into left and right-hand circularly polarized energy.

The left and right-hand circularly polarized energy derived by transducers 132–135 and 138 is fed to monopulse combining network 143. Network 143 responds to the left and right-hand circularly polarized outputs of dual-mode transducers 132–135 and 138 in accordance with:

$$\Delta_{AZ_{LHC}} = (B_{LHC} + D_{LHC}) - (C_{LCH} + E_{LHC}) \quad (11)$$
$$\Delta_{EL_{LHC}} = (B_{LHC} + C_{LHC}) - (D_{LHC} + E_{LHC}) \quad (12)$$
$$\Sigma_{LHC} = A_{LHC} + B_{LHC} + C_{LHC} + D_{LHC} + E_{LHC} \quad (13)$$
$$\Delta_{AZ_{RHC}} = (B_{RHC} + D_{RHC}) - (C_{RHC} + E_{RHC}) \quad (14)$$
$$\Delta_{EL_{RHC}} = (B_{RHC} + C_{RHC}) - (D_{RHC} + E_{RHC}) \quad (15)$$
$$\Sigma_{RHC} = A_{RHC} + B_{RHC} + C_{RHC} + D_{RHC} + E_{RHC} \quad (16)$$

where:

$\Delta_{AX_{LHC}}$ is an indication of the target location in the azimuth plane, as determined in response to the left-hand circularly polarized energy transduced by elements 132–135;

$\Delta_{EL_{LHC}}$ is an indication of the target position in the elevation plane, as determined in response to the left-hand circularly polarized energy transduced by elements 123–135;

$\Sigma_{LHC}$ equals the sum of the left-hand circularly polarized energy transduced by elements 132–135 and 138;

$\Delta_{AZ_{RHC}}$ is an indication of the target location in the azimuth plane, as determined in response to the right-hand circularly polarized energy transduced by elements 132–135;

$\Delta_{EL_{RHC}}$ is an indication of the target position in the elevation plane, as determined in response to the right-hand circularly polarized energy transduced by elements 132–135; and $\Sigma_{RHC}$ equals the total amount of the right-hand circularly polarized energy transduced by elements 132–135 and 138, $B_{LHC}$ equals the amplitude of the left-hand circularly polarized energy transduced by element 133, $C_{LHC}$ equals the amplitude of the left-hand circularly polarized energy transduced by element 134, $D_{LHC}$ equals the amplitude of the left-hand circularly polarized energy transduced by element 132, $E_{LHC}$ equals the amplitude of the left-hand circularly polarized energy transduced by element 135, $A_{LHC}$ equals the amplitude of the left-hand circularly polarized energy transduced by element 138, $B_{RHC}$ equals the amplitude of the right-hand circularly polarized energy transduced by element 133, $C_{RHC}$ equals the amplitude of the right-hand circularly polarized energy transduced by element 134, $D_{RHC}$ equals the amplitude of the right-hand circularly polarized energy transduced by element 132, $E_{RHC}$ equals the amplitude of the right-hand circularly polarized energy transduced by element 135, and $A_{RHC}$ equals the amplitude of the right-hand circularly polarized energy transduced by element 138.

The relative phase between the left and right-hand circularly polarized sum signals derived by network 143, $\Sigma_{LHC}$ and $\Sigma_{RHC}$, is measured with a phase measuring network identical to that illustrated in FIG. 1. In particular, the $\Sigma_{LHC}$ and $\Sigma_{RHC}$ signals are adjusted so that both have identical phases. This operation is achieved by coupling the $\Sigma_{LHC}$ output signal of network 143 through variable phase shifter 144, the output of which drives four port hybrid 145, a second port of which is responsive to the $\Sigma_{RHC}$ output of network 143. Hybrid 145 responds to the inputs thereof to derive a pair of outputs representing the vector sum and difference of its two inputs.

The outputs of hybrid 145 are increased in amplitude by difference and sum R.F. amplifiers 150 and 200 and converted to an IF frequency by mixers 146 and 147, responsive to local oscillator 148 as well as the hybrid outputs. The IF output frequency of mixer 147 is fed through fixed 90° phase shifter 149 to one input of product detector 151, a second input of which is directly responsive to the output of mixer 146. Thereby, product detector 151 derives a D.C. output signal indicative of the ratio:

$$\frac{\Sigma_{LHC} - \Sigma_{RHC}}{\Sigma_{LHC} + \Sigma_{RHC}} \quad (17)$$

The ratio indicating output signal of product detector 151 is fed through low pass 152 to servo amplifier 153 which drives D.C. motor 154.

Motor 154 responds to the output of servo amplifier 153 to activate phase shifter 144 so that the $\Sigma_{LHC}$ and $\Sigma_{RHC}$ signals are in phase. Thereby, a phase measuring servoloop, as described supra with regard to FIG. 1 is provided to derive an indication of the angular orientation of the linearly polarized electromagnetic energy impinging on feed 101 relative to the horizontal.

In addition to providing an indication of the orientation of the linearly polarized energy impinging on array 101, the system of FIG. 6 enables the left-hand circularly polarized azimuth and elevation error signals to be phase aligned with the right-hand circularly polarized azimuth and elevation error signals. To this end, phase shifters 155 and 156 are connected to the $\Delta_{AZ_{LHC}}$ and $\Delta_{EL_{LHC}}$ output channels of combining network 143. Phase shifters 155 and 156 are ganged with phase shifter 144 to be driven by motor 154 and are arranged to introduce exactly the same phase shift as in the $\Delta_{AZ_{LHC}}$ and $\Delta_{EL_{LHC}}$ outputs of network 143 as is introduced by phase shifter 144. Thereby, the azimuth and elevation target position indicating output signals of network 143 are phase aligned in both the left and right-hand circular polarization directions.

The phase aligned azimuth indicating signals derived by phase shifter 155 and network 143 for the left and right-hand circular polarized directions are combined in power divider 157, while the right-hand elevation indicating signals derived by network 143 and phase shifter 156 are combined in power divider 158. Power dividers 157 and 158 are operated in the reverse manner, whereby the energy applied to the input ports thereof is combined by a summation process, at the output ports of the power dividers. Hence, the amplitudes of the azimuth indicating signals are increased by 3 db over the amplitudes which are derived in response to a single polarization direction.

The azimuth and elevation indicating R.F. signals derived by power dividers 157 and 158 are combined with the vector sum output signals of hybrid 145, indicative of the total energy transduced by array 101 from the target being tracked, i.e., the total energy in both polarization directions impinging on array 101. To this end, there is provided monopulse receiver and indicator network 159, responsive to the outputs of power dividers 157 and 158, as well as the vector sum of hybrid 145.

A feature of the system of FIG. 6 is that the transmitted energy is maintained at a predetermined polarization relationship with respect to the received polarization direction. In particular, energy is transmitted from centrally located feed element 102 with a linear polarization having an orientation angle 90° displaced from the orientation angle of the energy received by the array from the target. To achieve this result, the output of motor 154 drives phase shifter 141 in synchronism with phase shifters 144, 155 and 156. Phase shifter 141, however, is adjusted so that the phase shift introduced thereby is 180° displaced from the phase shift of networks 144, 155 and 156. By adjusting the setting of phase shifter 141 to be 180° displaced from the phase shift of elements 144, 155 and 156, the desired 90° polarization direction relationship between received and transmitted energy relative to feed 101 is achieved.

The 90° phase relationship is desired in one particular application of the present invention wherein a space satellite transponder translates the polarization direction of transmitted energy 90° from the polarization angle of received energy. By adjusting the polarization direction of the linearly polarized waves transmitted from feed 101 in the manner indicated, maximum signal strength in the two links between the feed and transponder is achieved. Thereby, greater signal to noise ratio is attained and the accuracy of position indicating data derived with the receiver of FIG. 6 is achieved.

While there have been described and illustrated several specific embodiments of the invention, it will be clear that variations in the details of the embodiments specifically illustrated and described may be made. For example, the automatic feedback loop of FIG. 1 can be replaced by a manually operated feedback loop. In such an instance, a meter is connected to the output of low pass filter 77 and the setting of phase shifter 61 is adjusted by an operator until a null is read from the meter.

I claim:

1. In a system for tracking the polarization tilt angle of received linearly polarized electromagnetic waves or for controlling the polarization of transmitted electromagnetic waves, a feed having a pair of mutually orthogonal linear radiating elements, means for exciting said elements with circularly polarized waves of oppositely rotating polarizations, a bilateral circuit having two pairs of ports, the voltage vectors at the first of said pairs of ports being represented by A and B and the voltage outputs at the second of said pairs of ports being represented by:

$$C = A + Be^{j\Phi}$$
$$D = A - Be^{-j\Phi}$$

where $\Phi$ = phase angle, and variable phase shift means coupling the first pair of said ports with said exciting means for controlling the relative phase angle of the opositely rotating polarized waves.

2. The system of claim 1 wherein said exciting means includes a second bilateral circuit having two pairs of ports having the same energy exchange relationship as the pairs of ports of the other bilateral circuit, means for coupling energy between one of said pairs of ports of said second circuit and said elements, and means for coupling energy between the other of said pairs of ports of said second circuit and said phase shift means and between one of the ports of the first pair of ports of the other circuit.

3. The system of claim 1 wherein said feed includes a plurality of pairs of said mutually orthogonal linear radiating elements, said plurality of pairs of elements being spaced from each other, and said exciting means includes means for combining energies having the same polarizations to derive a pair of excitation patterns, each of said patterns being for a different polarization, and each of said patterns being responsive to the sum of the radiation in the polarization associated with it.

4. The system of claim 3 wherein said excitation means includes means for deriving sum patterns for a pair of orthogonal linear polarization directions.

5. The system of claim 3 wherein said excitation means includes means for deriving sum patterns for a pair of oppositely rotating circular polarizations.

6. A system for tracking the polarization tilt angle of received linearly polarized electromagnetic waves comprising means responsive to the received linearly polarized waves for deriving a pair of oppositely rotating circularly polarized waves having a phase displacement indicative of the polarization angle, means responsive to the circularly polarized waves for measuring the phase displacement, said measuring means comprising variable phase shifter means responsive to one of the circularly polarized waves, and means responsive to the phase shifter and the other circularly polarized wave for deriving a signal indicative of the ratio of the difference of the phase shifted wave from the other circularly polarized wave to the sum of the phase shifted and other circularly polarized waves.

7. The system of claim 6 wherein said measuring means further includes feedback means responsive to said signal deriving means for controlling the phase shift of the phase shifter.

8. The system of claim 7 wherein said signal deriving means includes a circuit having first, second, third and fourth ports, said first and second ports being respectively responsive to the phase shifted and other circularly polarized waves, said third and fourth ports being responsive to the energies at said first and second ports for deriving signals directly proportional to the vector sum and difference of the energies at said first and second ports.

9. The system of claim 8 wherein said signal deriving means further includes means for multiplying the signal derived at said fourth port with a 90° phase shifted replica of the signal derived at said third port.

10. The system of claim 6 wherein said signal deriving means includes a circuit having first, second, third and fourth ports, said first and second ports being respectively responsive to the phase shifted and other circularly polarized waves, said third and fourth ports being responsive to the energies at said first and second ports for deriving signals directly proportional to the vector sum and difference of the energies at said first and second ports.

11. The system of claim 10 wherein said signal deriving means further includes means for multiplying the signal derived at said fourth port with a 90° phase shifted replica of the signal derived at said third port.

12. The system of claim 6 wherein said circular wave deriving means includes a feed having a pair of mutually orthogonal linear radiating elements, a bilateral circuit having two pairs of ports, the ports of the first pair of said ports being individually coupled with a different one of said radiating elements, the ports of the second pair of ports deriving signals indicative of the vector sum and difference of the energies at said first pair of ports, the signals at said second pair of ports being said oppositely rotating circularly polarized waves.

13. A method of tracking the polarization tilt angle of received linearly polarized electromagnetic waves comprising the steps of converting the waves into a pair of oppositely rotating circularly polarized waves having a phase displacement indicative of the polarization angle, measuring the phase displacement between the circularly polarized waves by shifting the phase of one of the circularly polarized waves until it has the same phase as the other wave, the phase difference between the phase shifted and other circularly polarized waves being determined by measuring the ratio between the difference of the phase shifted wave from the other wave to the sum of the phase shifted and other waves.

14. A system for controlling the polarization of transmitted electromagnetic energy comprising a source of said energy, a first circuit having a pair of input ports and a pair of output ports and including means for deriving energies at the output ports in response to the vector sum and difference of the energies at the input ports, first variable phase shift means for coupling energy from said source to said input ports, second variable phase shift means responsive to the energy derived at one of said output ports, a feed having a pair of mutually orthogonal linear radiating elements, and a circular polarization to linear polarization transducer responsive to the second phase shift means and the other of said output ports for coupling energies derived from the phase shift means and the other output port to said radiating elements.

15. The system of claim 14 wherein each of said phase shifters is variable over a 360° range.

16. The system of claim 15 wherein said transducer includes a second circuit having a pair of input ports and a pair of output ports and means for deriving energies at the output ports in response to the vector sum and difference of the energies at the input ports, said input ports of the second circuit being separately responsive to the energy derived from said phase shift means and the other output port of the first circuit, and means for coupling energy from the output ports of said second circuit to said radiating elements with a differential phase shift of 90°.

17. A system for tracking the polarization tilt angle of received linearly polarized electromagnetic waves comprising a feed having a plurality of pairs of mutually orthogonal linear radiating elements, said plurality of pairs of elements being spaced from each other, means exciting said feed for combining energies having the same polarizations to derive a pair of excitation patterns, each of said patterns being for a different polarization and each of said patterns being responsive to the sum of the radiation in the polarization associated with it, said exciting means including means for deriving a pair of oppositely rotating circularly polarized electromagnetic waves indicative of a different one of said sum patterns, said waves having a phase displacement commensurate with the polarization tilt angle of the received waves, and means for measuring the relative phase displacement of said circularly polarized waves.

18. The system of claim 17 wherein said measuring means comprises variable phase shifter means responsive to one of the circularly polarized waves, and means responsive to the phase shifter and the other circularly polarized wave for deriving a signal indicative of the ratio of the difference of the phase shifted wave from the other circularly polarized wave to the sum of the phase shifted and other circularly polarized waves.

19. The system of claim 18 wherein said exciting means includes means for transducing the response of each pair of each plurality of radiating elements into a pair of oppositely rotating circularly polarized electromagnetic waves.

20. The system of claim 18 wherein said exciting means includes means for deriving each of said sum patterns as a linearly polarized wave, the linearly polarized sum patterns having mutually orthogonal polarizations, and means for transducing said linearly polarized sum patterns into said pair of oppositely rotating circularly polarized waves.

21. The system of claim 17 wherein said exciting means includes means for transducing the response of each pair of each plurality of radiating elements into a pair of oppositely rotating circularly polarized electromagnetic waves.

22. The system of claim 17 wherein said exciting means includes means for deriving each of said sum patterns as a linearly polarized wave, the linearly polarized sum patterns having mutually orthogonal polarizations, and means for transducing said linearly polarized sum patterns into said pair of oppositely rotating circularly polarized waves.

23. A system for controlling the polarization angle of linearly polarized transmitted energy in response to the polarization orientation of received linearly polarized energy comprising a feed having a pair of mutually orthorgonal linear radiating elements, means for transducing the linearly polarized waves received by the elements into a first pair of oppositely rotating circularly polarized waves having a phase displacement indicative of the polarization orientation, means for measuring the phase displacement of the first pair of circularly polarized waves, said measuring means including first variable phase shift means for phase aligning the two oppositely rotating circularly polarized waves, a source of transmitter energy, means for transducing the transmitter energy into a second pair of oppositely rotating circularly polarized waves, means responsive to the second pair of oppositely polarized waves for exciting said elements so that they derive a linearly polarized wave having a predetermined polarization orientation angle with respect to the received energy polarization orientation angle, and second variable phase shift means synchronized with the first variable phase shift means for differentially modifying the phases of the circularly polarized waves coupled to the exciting means.

24. The system of claim 23 wherein said measuring means further includes feedback means for controlling the first phase shift means to maintain the two oppositely rotating circularly polarized waves in phase alignment.

25. In combination with a monopulse antenna having a feed including a plurality of pairs of mutually orthogonal linear radiating elements, means exciting said feed for combining energies having the same polarizations to derive a pair of sum excitation patterns and a pair of difference, target position indicative error patterns, each of said pair of sum patterns being for a different first and second polarization, each of said pair of difference patterns being for a different one of the first and second polarizations, said exciting means including means for deriving a pair of oppositely rotating circularly polarized waves indicative of a different one of said sum patterns, said waves having a phase displacement commensurate with the polarization tilt angle of the received waves, and means for measuring the relative phase displacement of said circularly polarized waves, and means for combining the two sum patterns and the two difference patterns to derive an indication of the target position.

26. The system of claim 25 wherein said exciting means includes means for deriving each of said sum patterns as a linearly polarized wave, the linearly polarized sum patterns having mutually orthogonal polarizations.

27. The system of claim 26 wherein said combining means comprises a monopulse diversity polarization receiver responsive to the linearly polarized sum patterns.

28. The system of claim 27 further including a different parametric amplifier responsive to each of said linearly polarized sum patterns, and means for coupling outputs of the amplifiers in parallel to said diversity receiver and phase measuring means.

29. The system of claim 25 wherein said exciting means includes means for transducing the response of each pair of each pluarity of radiating elements into a pair of oppositely rotating circularly polarized electromagnetic waves.

30. The system of claim 29 wherein said means for measuring includes a first variable phase shifter for phase aligning the sum patterns of the first and second circular polarizations, and second variable phase shift means ganged with said first phase shift means for phase aligning the difference patterns of the first and second circular polarizations.

31. The system of claim 30 further including a source of transmitter energy, means for transducing the transmitter energy into a further pair of oppositely rotating circularly polarized waves, means responsive to said further pair of oppositely rotating polarized waves for exciting said elements so that they derive a linearly polarized wave having a predetermined orientation angle with respect to the received energy polarization angle, and further variable phase shift means ganged with the first and second phase shift means for differentially modifying the phase of the circularly polarized waves applied to the radiating elements.

References Cited
UNITED STATES PATENTS

| | | |
|---|---|---|
| 3,137,853 | 6/1964 | Cutler. |
| 3,209,355 | 9/1965 | Livingston. |
| 3,310,805 | 3/1967 | Viglietta et al. |

RODNEY D. BENNETT, Jr., Primary Examiner

T. H. TUBBESING, Assistant Examiner

U.S. Cl. X.R.

343—16, 100